United States Patent
Suzuki et al.

(10) Patent No.: US 8,505,675 B2
(45) Date of Patent: Aug. 13, 2013

(54) POWER STEERING APPARATUS

(75) Inventors: Tatsuro Suzuki, Atsugi (JP); Satoshi Taniuchi, Fujisawa (JP); Kohtaro Shiino, Sagamihara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 248 days.

(21) Appl. No.: 13/047,315

(22) Filed: Mar. 14, 2011

(65) Prior Publication Data
US 2011/0240399 A1 Oct. 6, 2011

(30) Foreign Application Priority Data
Mar. 31, 2010 (JP) .................................. 2010-079969

(51) Int. Cl.
*B62D 5/04* (2006.01)
(52) U.S. Cl.
USPC .......................................................... 180/444
(58) Field of Classification Search
USPC ................................................ 180/443, 444
See application file for complete search history.

(56) References Cited

U.S. PATENT DOCUMENTS

| 2008/0035414 | A1* | 2/2008 | Kubota et al. | 180/444 |
| 2008/0128195 | A1* | 6/2008 | Kubota et al. | 180/444 |
| 2009/0120713 | A1* | 5/2009 | Oberle | 180/444 |

FOREIGN PATENT DOCUMENTS
JP 2009-046060 A 3/2009

* cited by examiner

*Primary Examiner* — Kevin Hurley
(74) *Attorney, Agent, or Firm* — Foley & Lardner LLP

(57) ABSTRACT

A power steering apparatus including a joint including a first boss disposed on an axial end portion of a motor output shaft, first projections disposed on the first boss in the circumferential direction, a second boss disposed on an axial end portion of a worm shaft and opposed to the first boss, second projections disposed on the second boss in the circumferential direction and arranged between the adjacent first projections, a first elastic member made of metal and a second elastic member made of at least one of resin and rubber, the first and second elastic members being disposed between an axial end surface of the first boss and an opposed axial end surface of the second boss and cooperating with each other to generate an elastic force in such a direction as to move the worm shaft away from the motor output shaft.

20 Claims, 9 Drawing Sheets

POWER STEERING APPARATUS

BACKGROUND OF THE INVENTION

The present invention relates to a power steering apparatus which is usable in a vehicle, for instance, an automobile and the like, and adapted to assist a steering torque to be inputted by a vehicle operator by using a rotational torque of an electric motor.

Japanese Patent Application Unexamined Publication No. 2009-46060 discloses an electric power steering apparatus including an electric motor which is driven to rotate in accordance with a steering input torque detected by a torque sensor provided on a steering input shaft. The rotational torque of the electric motor is transmitted to a steering output shaft through a worm reduction mechanism, to thereby assist a steering effort of a vehicle operator.

The electric power steering apparatus of the conventional art includes a joint for connecting a motor output shaft of the electric motor and a worm shaft. The joint is constituted of an external-teeth member to be press-fitted to the motor output shaft of the electric motor and an internal-teeth member to be press-fitted to the worm shaft. A damping member is interposed between the external-teeth member and the internal-teeth member to thereby suppress generation of noise due to vibration of the motor output shaft of the electric motor and the worm shaft.

SUMMARY OF THE INVENTION

However, the power steering apparatus of the above-described conventional art is constructed to have a clearance between the external-teeth member and the internal-teeth member in an axial direction thereof. Due to such a construction of the power steering apparatus, there tends to be generated a play in an axial direction of bearings (i.e., an axial clearance) which support the motor output shaft of the electric motor and the worm shaft. As a result, the motor output shaft of the electric motor and the worm shaft tends to be caused to vibrate in the axial direction thereof, thereby generating rattling noise.

It is an object of the present invention to solve the above-described problem in the conventional art and to provide a power steering apparatus capable of suppressing generation of rattling noise which is caused due to vibration of the motor output shaft of the electric motor and the worm shaft in the axial direction thereof.

In a first aspect of the present invention, there is provided a power steering apparatus including:
  a steering mechanism constructed to transmit a rotational operation of a steering wheel to steerable road wheels;
  an electric motor having a motor output shaft rotatably supported by a first bearing, the electric motor providing the steering mechanism with a steering force via the motor output shaft;
  a worm gear including a worm wheel disposed on the steering mechanism, and a worm shaft rotatably supported by a second bearing and being engageable with the worm wheel; and
  a joint which connects the motor output shaft with the worm shaft so as to transmit a rotational torque of the motor output shaft to the worm shaft;
  the joint including:
  a first boss disposed on an axial end portion of the motor output shaft which is located on a side of the worm shaft;
  a plurality of first projections disposed on the first boss in a circumferential direction of the first boss, the respective first projections extending in a radial direction of the first boss,
  a second boss disposed on an axial end portion of the worm shaft which is located on a side of the motor output shaft, in an opposed relation to the first boss in an axial direction of the motor output shaft;
  a plurality of second projections disposed on the second boss in a circumferential direction of the second boss and arranged between the first projections disposed adjacent to each other in the circumferential direction of the first boss, the second projections each extending in a radial direction of the second boss and transmitting a rotational torque of the electric motor transmitted through the first projections to the worm shaft;
  a first elastic member disposed between an axial end surface of the first boss and an opposed axial end surface of the second boss which is opposed to the axial end surface of the first boss, the first elastic member being made of a metal material and formed to be elastically deformable in the axial direction the motor output shaft, and
  a second elastic member disposed between the axial end surface of the first boss and the opposed axial end surface of the second boss, the second elastic member being made of at least one of a resin material and a rubber material, the second elastic member cooperating with the first elastic member to generate an elastic force in such a direction as to move the worm shaft away from the motor output shaft, the second elastic member being compressively deformable so as to reduce an amount of deformation of the first elastic member when the first elastic member is compressively deformed due to a relative displacement of the motor output shaft and the worm shaft.

In a second aspect of the present invention, there is provided a power steering apparatus including:
  a steering mechanism constructed to transmit a rotational operation of a steering wheel to steerable road wheels;
  an electric motor having a motor output shaft rotatably supported by a first bearing, the electric motor providing the steering mechanism with a steering force via the motor output shaft;
  a worm gear including a worm wheel disposed on the steering mechanism, and a worm shaft rotatably supported by a second bearing and being engageable with the worm wheel; and
  a joint which connects the motor output shaft with the worm shaft so as to transmit a rotational torque of the motor output shaft to the worm shaft;
  the joint including:
  a first boss disposed on an axial end portion of the motor output shaft which is located on a side of the worm shaft;
  a plurality of first projections disposed on the first boss in a circumferential direction of the first boss, the respective first projections extending in a radial direction of the first boss,
  a second boss disposed on an axial end portion of the worm shaft which is located on a side of the motor output shaft, in an opposed relation to the first boss in an axial direction of the motor output shaft;
  a plurality of second projections disposed on the second boss in a circumferential direction of the second boss and arranged between the first projections disposed adjacent to each other in the circumferential direction of the first boss, the second projections each extending in a radial direction of the second boss and transmitting a rotational torque of the electric motor transmitted through the first projections to the worm shaft;

a first elastic member disposed between an axial end surface of the first boss and an opposed axial end surface of the second boss which is opposed to the axial end surface of the first boss, the first elastic member being made of a metal material and formed to be elastically deformable in the axial direction the motor output shaft, and a second elastic member disposed between the axial end surface of the first boss and the first elastic member or between the opposed axial end surface of the second boss and the first elastic member, the second elastic member being made of at least one of a resin material and a rubber material, the second elastic member cooperating with the first elastic member to generate an elastic force in such a direction as to move the worm shaft away from the motor output shaft.

In a third aspect of the present invention, there is provided a power steering apparatus including:

a steering mechanism constructed to transmit a rotational operation of a steering wheel to steerable road wheels;

an electric motor having a motor output shaft rotatably supported by a first bearing, the electric motor providing the steering mechanism with a steering force via the motor output shaft;

a worm gear including a worm wheel disposed on the steering mechanism, and a worm shaft rotatably supported by a second bearing and being engageable with the worm wheel; and a joint which connects the motor output shaft with the worm shaft so as to transmit a rotational torque of the motor output shaft to the worm shaft;

the joint including:

a first boss disposed on an axial end portion of the motor output shaft which is located on a side of the worm shaft;

a plurality of first projections disposed on an outer circumferential side of the first boss, the respective first projections extending in a radial direction of the first boss, a second boss disposed on an axial end portion of the worm shaft which is located on a side of the motor output shaft, in an opposed relation to the first boss in an axial direction of the motor output shaft;

a sleeve portion disposed on an end portion of the second boss which is located on a side of the motor output shaft, the sleeve portion being formed to surround the first boss and the first projections, a plurality of second projections disposed on an inner circumferential side of the sleeve portion in a circumferential direction of the sleeve portion, the second projections being arranged between the first projections disposed adjacent to each other in the circumferential direction of the first boss, the respective second projections extending in a radial direction of the sleeve portion and transmitting a rotational torque of the electric motor transmitted through the first projections to the worm shaft;

a first elastic member of an annular shape disposed between an axial end surface of the first boss and an opposed axial end surface of the second boss which is opposed to the axial end surface of the first boss, the first elastic member being disposed on a radial inside of a radial inner end of the respective second projections, the first elastic member being made of a metal material and formed to be elastically deformable in the axial direction the motor output shaft, and a second elastic member including:

a plurality of third projections disposed on the second elastic member in circumferential direction of the second elastic member, the third projections each being disposed between the first projection and the second projection which are disposed adjacent to each other in the circumferential direction when the first projections are accommodated in the sleeve portion, the third projections each being disposed to fill a circumferential clearance between the first projection and the second projection which are disposed adjacent to each other in the circumferential direction, the third projections being made of at least one of a resin material and a rubber material, and a connecting portion disposed between the first elastic member and the axial end surface of the first boss so as to connect the third projections with each other, the connecting portion being made of a same material as that for the third projections and integrally formed with the third projections, the connecting portion cooperating with the first elastic member to generate an elastic force in such a direction as to move the worm shaft away from the motor output shaft.

The other objects and features of this invention will become understood from the following description with reference to the accompanying drawings.

DETAILED DESCRIPTION OF THE INVENTION

A power steering apparatus according to respective embodiments of the present invention will be explained hereinafter with reference to the accompanying drawings. The power steering apparatus according to the respective embodiments can be applied to an electric power steering apparatus for an automobile, similarly to the conventional art.

Figure 1:
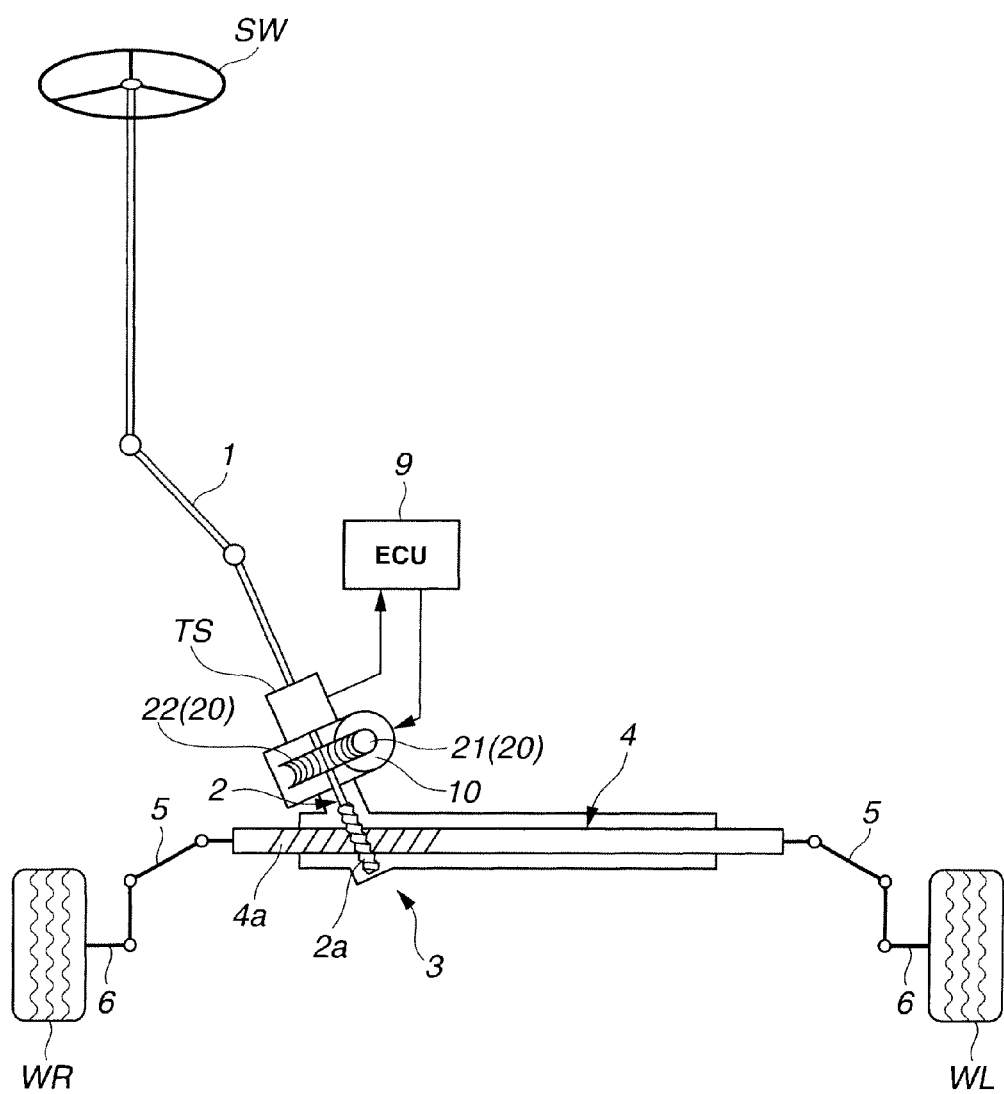
FIG. 1 is a schematic diagram showing an electric power steering apparatus according to a first embodiment of the present invention which is applied to an electric power steering apparatus for an automobile.

FIG. 1 to FIG. 11 show an electric power steering apparatus according to a first embodiment of the present invention. As shown in FIG. 1, the electric power steering apparatus according to the first embodiment includes a steering mechanism for transmitting a rotational operation of steering wheel SW to steerable road wheels WR, WL. The steering mechanism includes input shaft 1, output shaft 2 connected to input shaft 1, and rack-and-pinion mechanism 3 connected to output shaft 2. Input shaft 1 has one end portion which is connected to steering wheel SW so as to make a unitary rotation, and the other end portion connected to one end portion of output shaft 2 through a torsion bar (not shown). The other end portion of output shaft 2 is connected to steerable road wheels WR, WL through rack-and-pinion mechanism 3. Rack-and-pinion mechanism 3 is a generally known type including pinion teeth 2a formed on the other end portion of output shaft 2, and rack shaft 4 having rack teeth 4a meshing with pinion teeth 2a which are formed in a predetermined axial region of rack shaft 4. Opposite axial ends of rack shaft 4 are connected to steerable road wheels WR, WL through tie rods 5, 5, respectively.

When steering wheel SW is rotationally operated, input shaft 1 is rotated in synchronization with the rotation of steering wheel SW, thereby twisting the torsion bar. Output shaft 2 is caused to follow the rotation of input shaft 1 to rotate due to an elastic force of the torsion bar. The rotation of output shaft 2 is converted to a linear axial movement of rack shaft 4. In accordance with the axial movement of rack shaft 4, knuckles 6, 6 are drawn leftward and rightward through tie rods 5,5, so that road wheels WR, WL are steered.

Figure 2:
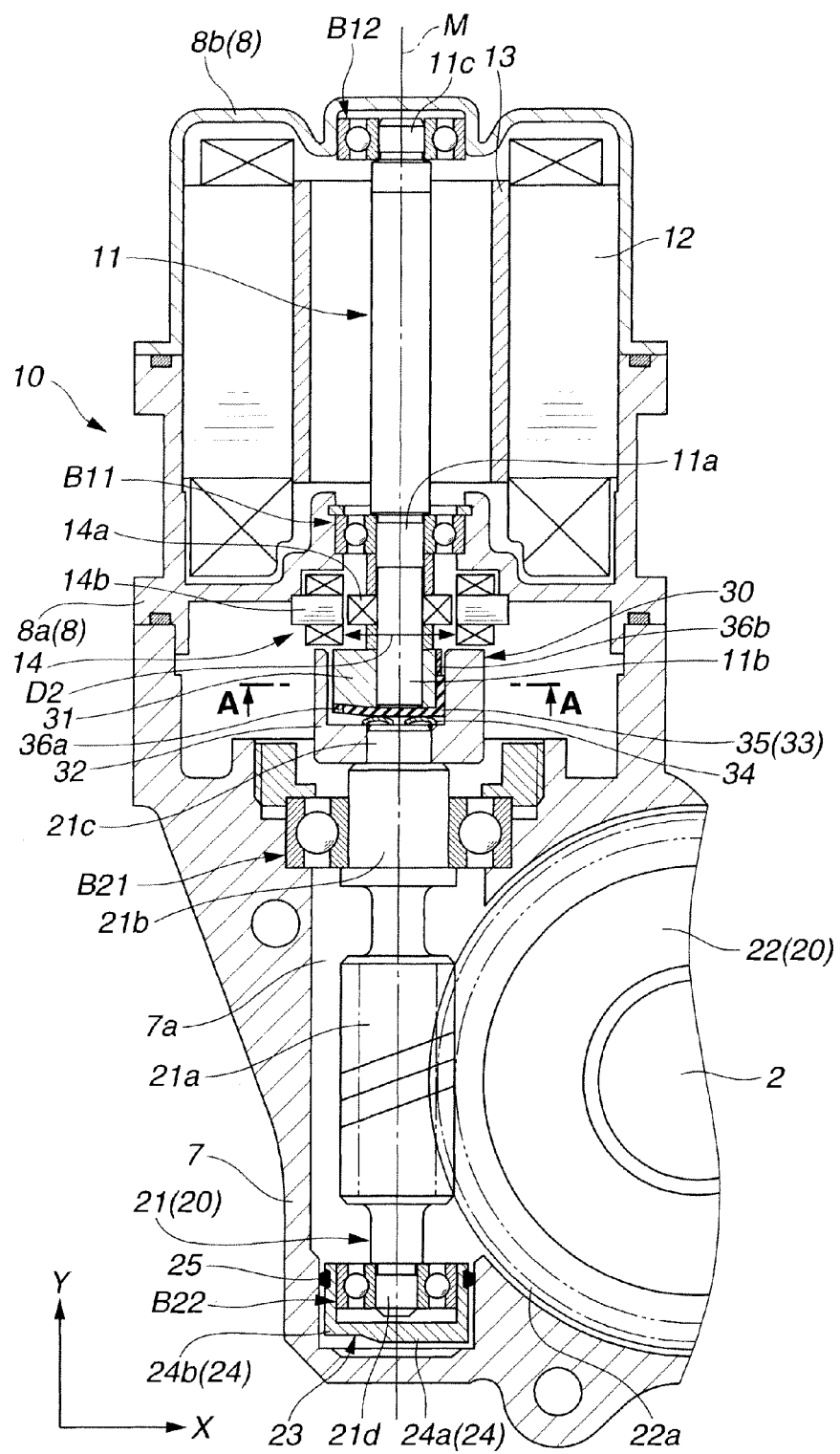
FIG. 2 is a cross section of an essential part of the electric power steering apparatus shown in FIG. 1.

As shown in FIG. 1 and FIG. 2, the electric power steering apparatus according to the first embodiment further includes housing 7 disposed on an outer circumferential side of a portion connecting input shaft 1 and output shaft 2, torque sensor TS accommodated within housing 7, electric motor 10 rotatable in positive and reverse directions, and worm gear 20 as a reduction mechanism which transmits the rotational torque of electric motor 10 to output shaft 2. Torque sensor TS detects a steering torque on the basis of an amount of a relative rotation displacement of input shaft 1 and output shaft 2. Electric motor 10 is driven and controlled by control unit 9 on the basis of a result of detection of torque sensor TS, a vehicle speed signal and the like, and generates an assist torque in accordance with the steering torque. When a steering operation is carried out by a vehicle operator, the rotational driving direction of electric motor 10 is changed in accordance with the direction of the steering operation, and the rotational torque of electric motor 10 is outputted to worm gear 20. As a result, the assist torque corresponding to a steering torque given by the vehicle operator is transmitted to output shaft 2.

In this embodiment, electric motor 10 is a so-called brushless DC motor. As shown in FIG. 2, electric motor 10 includes motor housing 8a mounted to an end portion of housing 7 in a positive direction of axis Y, stator 12 fitted to an inner circumferential surface of motor housing 8, rotor 13 which is allowed to rotate by excitation of stator 12, and motor output shaft (i.e., drive shaft for worm shaft 21) 11 which is constructed to make a unitary rotation with rotor 13 and drives worm shaft 21 as explained later. Motor housing 8a is disposed to close worm gear accommodating chamber 7a which is formed in housing 7 so as to be open to an end surface of housing 7 in the positive direction of axis Y. Motor output shaft 11 is connected to worm shaft 21 through joint 30 and drives worm shaft 21 to rotate on the basis of a rotational force of rotor 13. In addition, motor housing 8 is directly fixed to housing 7 and includes housing portion 8a accommodating a half of electric motor 10 which is located in a negative direction of axis Y shown in FIG. 2 and yoke portion 8b accommodating a half of electric motor 10 which is located in the positive direction of axis Y shown in FIG. 2.

Motor output shaft 11 is arranged coaxially with worm shaft 21. Motor output shaft 11 has one axial end portion which projects from housing portion 8a toward the side of worm gear accommodating chamber 7a and is exposed to an inside of worm gear accommodating chamber 7a. The one axial end portion of motor output shaft 11 is steppedly tapered toward a tip end thereof and includes larger diameter portion 11a disposed on the side of housing portion 8a and smaller diameter portion 11b disposed on the side of worm shaft 21. The one axial end portion of motor output shaft 11 is supported at larger diameter portion 11a by housing portion 8a through first tip end side bearing B11 of a first bearing group (a first bearing according to the present invention) which is constituted of a pair of bearings. The other axial end portion 11c of motor output shaft 11 is supported on yoke portion 8b through first base end side bearing B12 of the first bearing group.

Smaller diameter portion 11b of the one axial end portion of motor output shaft 11 is connected with smaller diameter portion 21c of worm shaft 21 through joint 30. Smaller diameter portion 21c is disposed at one axial end portion of worm shaft 21 and located on the side of motor output shaft 11. External-teeth member 31 which constitutes a part of joint 30 is press-fitted and fixed onto smaller diameter portion 11b. Thus, external-teeth member 31 and smaller diameter portion 11b cooperate with each other to form an united body.

In addition, electric motor 10 is provided with resolver 14 which detects a rotation angle of motor output shaft 11. Resolver 14 includes resolver rotor 14a fixed to an outer circumferential surface of smaller diameter portion 11b of motor output shaft 11, and resolver stator 14b which is disposed on a radially outer side of resolver rotor 14a so as to surround resolver rotor 14a. Electric motor 10 is drivingly controlled by control unit 9 on the basis of the rotation angle of motor output shaft 11 which is detected by resolver 14.

Worm gear 20 includes worm shaft 21 with worm teeth portion 21a which is formed in a predetermined region of an axial middle portion of worm shaft 21, and worm wheel 22 having teeth portion 22a on an outer circumferential surface thereof which is meshed with worm teeth portion 21a. Worm shaft 21 has opposite axial end portions which are supported on housing 7 through a pair of bearings, i.e., second tip end side bearing (one end side bearing according to the present invention) B21 and second base end side bearing (the other end side bearing according to the first embodiment of the present invention) B22. Second tip end side bearing B21 and second base end side bearing B22 constitute a second bearing group (a second bearing according to the present invention). Worm wheel 22 is integrally fixed to an outer circumferential surface of output shaft 2. Worm shaft 21 and worm wheel 22 are constructed to mesh with each other through teeth portions 21a, 22a in a torsional relationship therebetween (that is, in this embodiment, at a shaft angle therebetween of 90°). However, worm shaft 21 and worm wheel 22 may be constructed to mesh with each other at other shaft angles.

Worm shaft 21 includes one axial end portion located on the side of motor output shaft 11. The one axial end portion of worm shaft 21 includes larger diameter portion 21b supported by second tip end side bearing B21, and smaller diameter portion 21c extending from larger diameter portion 21b and stepwise tapered toward the side of motor output shaft 11.

Smaller diameter portion 21c is connected to smaller diameter portion 11b of motor output shaft 11 through joint 30. Internal-teeth member 32 which constitutes a part of joint 30 is press-fitted and fixed onto smaller diameter portion 21c. Thus, internal-teeth member 32 and smaller diameter portion 21c cooperate with each other to form an united body.

The other axial end portion 21d of worm shaft 21 is supported by second base end side bearing B22 and provided with preload mechanism 23 which always presses or biases the other axial end portion 21d toward such a direction as to enhance the engagement between worm shaft 21 and worm wheel 22, that is, in a positive direction of axis X shown in FIG. 2. With the provision of preload mechanism 23, a backlash between teeth portions 21a, 22a can be suitably adjusted.

Preload mechanism 23 includes bearing holder 24 which is fitted onto second base end side bearing B22 in the direction of axis Y as shown in FIG. 2 so as to accommodate and hold second base end side bearing B22, and annular elastic member 25, for instance, an O ring, which is made of a resin material and fitted on an outer circumferential surface of bearing holder 24. Bearing holder 24 has a generally cup-shape as a whole and includes stationary portion 24a which serves to accommodate and hold second base end side bearing B22 therein, and movable portion 24b which is constructed to be deformable relative to stationary portion 24a in a radial direction of worm wheel 22. Movable portion 24b is disposed on an opposite side of worm wheel 22 such that worm shaft 21 is sandwiched between movable portion 24b and worm wheel 22. Annular elastic member 25 biases second base end side bearing B22 and the other axial end portion 21d of worm shaft 21 toward the side of worm wheel 22 by the elastic force thereof, thereby adjusting the backlash between teeth portions 21a, 22a.

In other words, in order to ensure performance of preload mechanism 23, the power steering apparatus according to this embodiment is constructed such that the other axial end portion 21d of worm shaft 21 is displaceable to a larger extent than the one axial end portion of worm shaft 21 with respect to joint 30 as a fulcrum, and worm shaft 21 is inclinable relative to motor output shaft 11.

Figure 3:
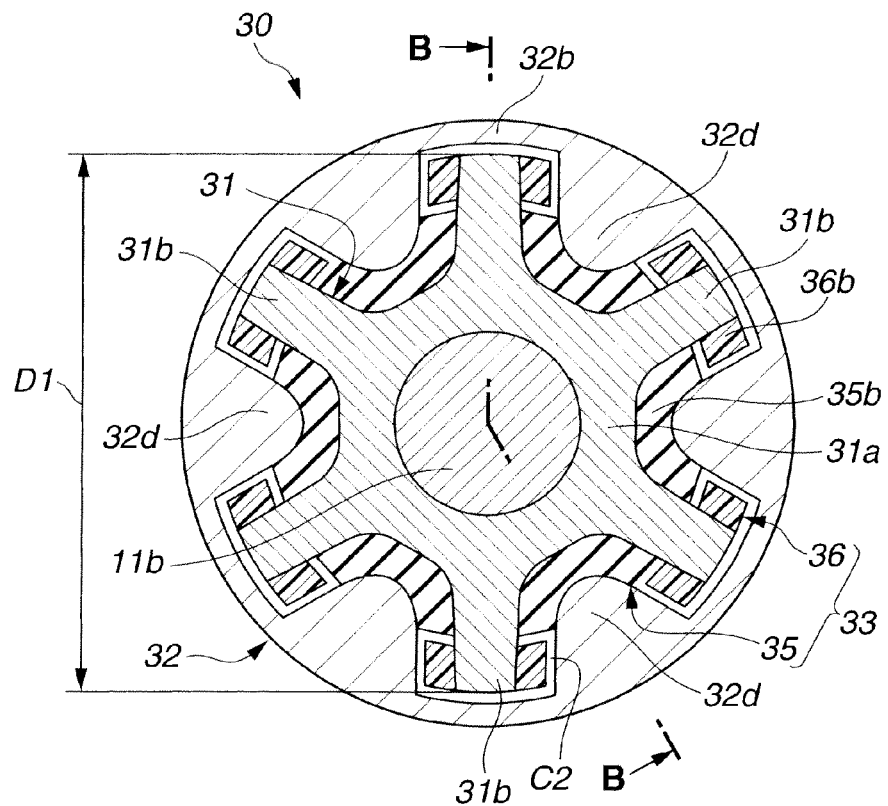
FIG. 3 is an enlarged cross section, taken along line A-A shown in FIG. 2.
Figure 4:
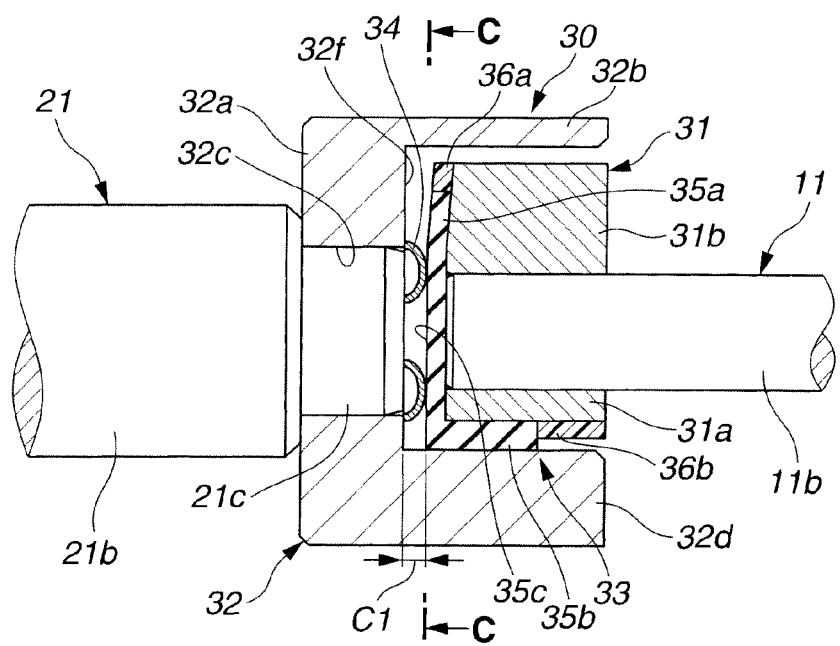
FIG. 4 is an enlarged cross section, taken along line B-B shown in FIG. 3.
Figure 5:
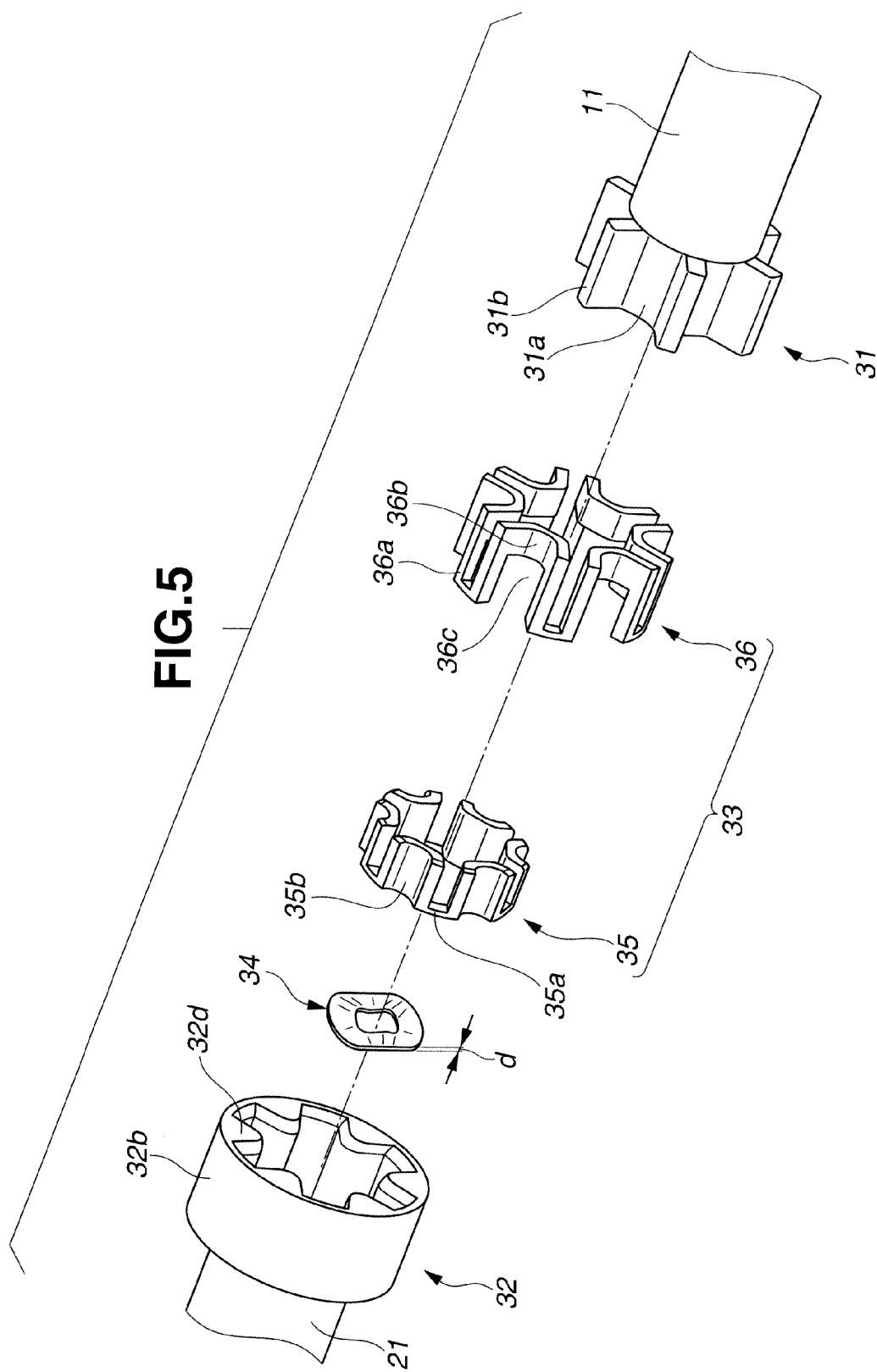
FIG. 5 is an exploded perspective view of a joint in the electric power steering apparatus shown in FIG. 2.

As shown in FIG. 3 to FIG. 5, joint 30 includes external-teeth member (a first boss according to the present invention) 31, internal-teeth member (a second boss according to the present invention) 32, buffer member 33 disposed between external-teeth member 31 and internal-teeth member 32, and wave washer (a first elastic member according to the present invention) 34 disposed between buffer member 33 and internal-teeth member 32. External-teeth member 31 is press-fitted and fixed onto an outer circumferential surface of smaller diameter portion 11b of motor output shaft 11. Internal-teeth member 32 is press-fitted and fixed onto an outer circumferential surface of smaller diameter portion 21c of worm shaft 21. Internal-teeth member 32 receives external-teeth member 31 on a radial inside thereof and is in meshing engagement with external-teeth member 31 in a circumferential direction thereof. Buffer member 33 is disposed in a circumferential clearance formed between internal-teeth member 32 and external-teeth member 31 and has a predetermined elastic characteristic. Wave washer 34 is disposed in axial clearance C1 formed between buffer member 33 and internal-teeth member 32 and is an elastic member made of a metal material. The rotational torque of motor output shaft 11 is transmitted to worm shaft 21 through the meshing between external-teeth member 31 and internal-teeth member 32.

As shown in FIG. 4 and FIG. 5, external-teeth member 31 includes cylindrical base 31a fitted onto the outer circumferential surface of smaller diameter portion 11b of motor output shaft 11, and a plurality of external teeth (first projections according to the present invention) 31b disposed on an outer circumferential surface of cylindrical base 31a in a circumferentially spaced relation to each other. Outer teeth 31b are integrally formed with cylindrical base 31a and extend in a radially outward direction of cylindrical base 31a. Outer teeth 31b are supported on cylindrical base 31a in an overhang or cantilever state.

In addition, as shown in FIG. 2 and FIG. 3, external-teeth member 31 has outer diameter D1 smaller than inner diameter D2 of resolver stator 14b. Owing to the difference between outer diameter D1 and inner diameter D2, upon assembling the power steering apparatus, resolver stator 14b can be assembled to housing portion 8a after external-teeth member 31 is assembled to motor output shaft 11. Meanwhile, such reduction in outer diameter of external-teeth member 31 leads to reduction in pressure receiving area between external teeth 31b and internal teeth 32d of internal-teeth member 32. However, joint 30 is configured to have an axial length sufficient to ensure the reduction in pressure receiving area between external teeth 31b and internal teeth 32d and thereby obtain predetermined torsional rigidity thereof.

As shown in FIG. 4 and FIG. 5, internal-teeth member 32 includes annular base 32a, sleeve portion 32b integrally formed with annular base 32a so as to extend from an outer periphery of annular base 32a toward the side of motor output shaft 11 in an axial direction of annular base 32a, and a plurality of internal teeth (second projections according to the present invention) 32d disposed on an inner circumferential surface of sleeve portion 32b in a circumferentially spaced relation to each other. Annular base 32a has through-hole 32c at a central portion thereof, through which annular base 32a is press-fitted and fixed onto the outer circumferential surface of smaller diameter portion 21c of worm shaft 21. Sleeve portion 32b is formed to surround external-teeth member 31 and external teeth 31b and cooperates with annular base 32a to form a cup shape. Inner teeth 32d are integrally formed with sleeve portion 32b and extend in a radially inward direction of sleeve portion 32b. Each of internal teeth 32d is disposed between adjacent two external teeth 31b so that internal teeth 32d are meshed with external teeth 31b. Inner teeth 32d are supported on sleeve portion 32b in an overhang or cantilever state.

As described above, teeth 31b, 32d are respectively formed to extend in the radially outward direction of cylindrical base 31a of external-teeth member 31 and in the radially inward direction of sleeve portion 32b of internal-teeth member 32, and supported in the overhang state. Therefore, with this construction of external-teeth member 31 and internal-teeth member 32 can be formed to have a relative large length in the axial direction thereof, so that it is possible to provide a sufficiently large contact area between buffer member 33 and outer and internal-teeth members 31, 32 and reduce a diameter of joint 30 while ensuring the predetermined torsional rigidity.

As shown in FIG. 3 to FIG. 9, buffer member 33 includes soft buffer member (a second elastic member according to the present invention) 35 made of a rubber material which has a relatively small elastic modulus, and hard buffer member 36 made of a resin material which has an elastic modulus larger than that of the rubber material of soft buffer member 35. Soft buffer member 35 and hard buffer member 36 are configured to be mutually engageable with each other.

Figure 6:
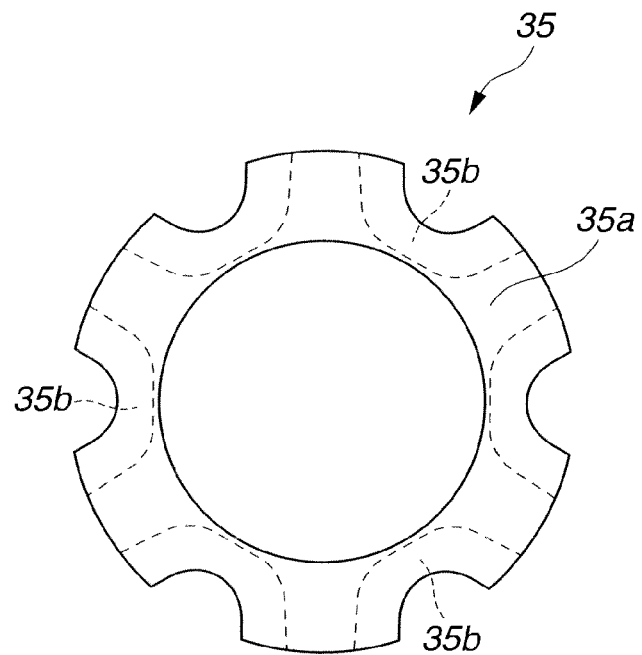
FIG. 6 is a front view of a soft buffer member of the joint shown in FIG. 5.
Figure 7:
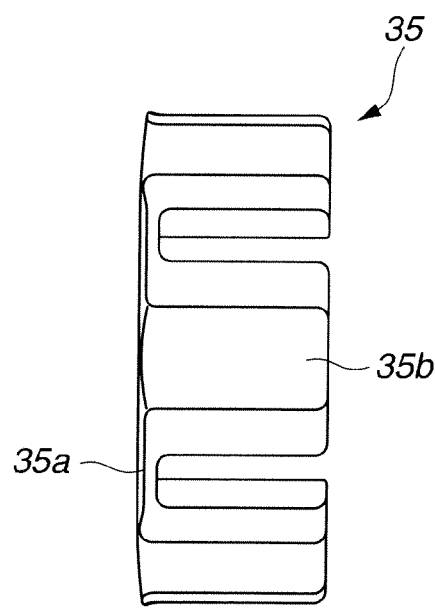
FIG. 7 is a side view of the soft buffer member shown in FIG. 6.

Specifically, as shown in FIG. 6 and FIG. 7, soft buffer member 35 has a generally annular shape. Soft buffer member 35 includes generally disk-shaped bridge portion (a connecting portion according to the present invention) 35a and a plurality of soft buffer portions (a third projection according to the present invention) 35*b* which are integrally formed with bridge portion 35*a* so as to extend from bridge portion 35*a* in an axial direction of soft buffer member 35. Bridge portion 35*a* has inside surface 35*c* which abuts on wave washer 34 when soft buffer member 35 is assembled to external-teeth member 31. Soft buffer portions 35*b* are formed to be open in a radially outward direction of soft buffer member 35 and form a generally U shape in a front view as shown in FIG. 6. Soft buffer portions 35*b* are connected with each other through bridge portion 35*a*. By fitting soft buffer member 35 onto external-teeth member 31 from the side of worm shaft 21, respective soft buffer portions 35*b* are arranged in a space between a tooth flank of respective external teeth 31*b* and a tooth flank of respective internal teeth 32*d* so as to fill the space between the tooth flanks.

Figure 8:
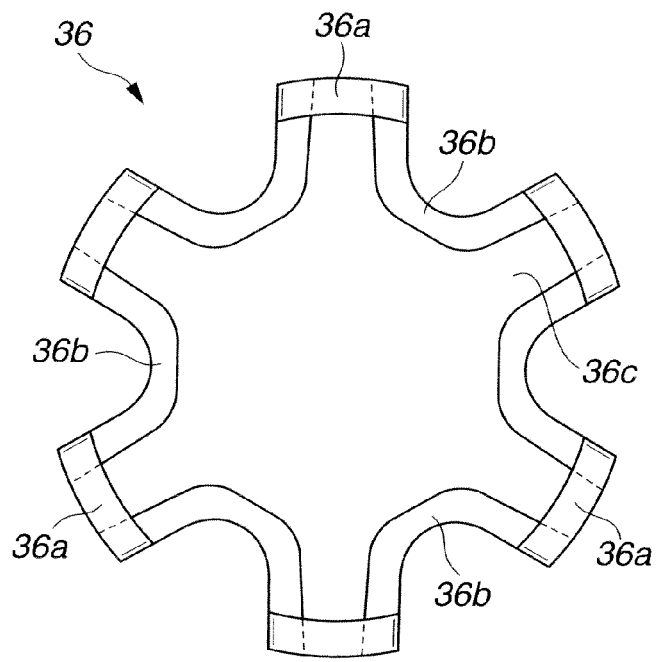
FIG. 8 is a front view of a hard buffer member of the joint shown in FIG. 5.
Figure 9:
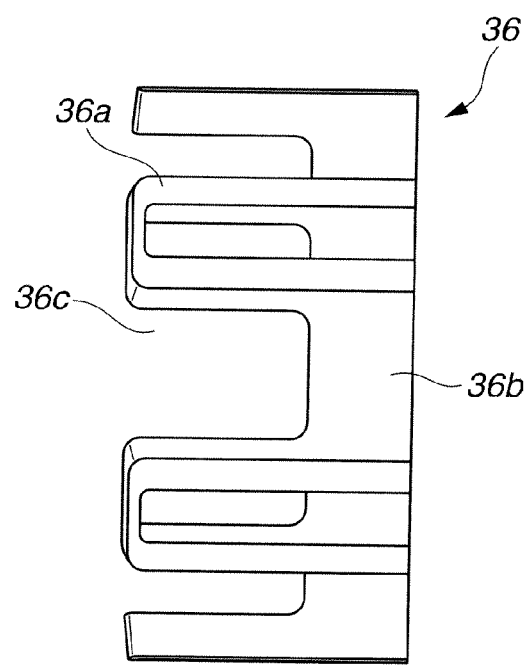
FIG. 9 is a side view of the hard buffer member shown in FIG. 8.

On the other hand, as shown in FIG. 8 and FIG. 9, hard buffer member 36 has a generally cylindrical shape as a whole. Hard buffer member 36 includes a plurality of hard buffer portions 36*b* disposed in a spaced relation to each other in a circumferential direction of hard buffer member 36, and a plurality of bridge portions 36*a* through which adjacent hard buffer portions 36*b* are connected with each other. Respective hard buffer portions 36*b* are formed to be open in a radially outward direction of hard buffer member 36 and form a generally U-shape in a front view as shown in FIG. 8. Respective bridge portions 36*a* are disposed on the side of worm shaft 21 over respective external teeth 31*b* in an axial direction of hard buffer member 36 and extend in a circumferential direction of hard buffer member 36 so as to connect the adjacent hard buffer portions 36*b* with each other and sandwich external teeth 31*b* therebetween. Further, hard buffer member 36 has soft buffer member accommodating portion 36*c* which is provided in the form of a recessed portion disposed on the inside of bridge portions 36*a* and accommodates soft buffer member 35. When soft buffer member 35 is accommodated in soft buffer member accommodating portion 36*c*, soft buffer member 35 and hard buffer member 36 are engaged with each other.

Specifically, when hard buffer member 36 is fitted onto external-teeth member 31, respective hard buffer portions 36*b* are fitted onto a portion of the tooth flank of respective external teeth 31*b* which is located on the side of motor output shaft 11. At the same time, a part of respective bridge portions 36*a* is fitted onto a portion of the tooth flank of respective external teeth 31*b* which is located on the side of worm shaft 21 and on the radially outside of respective external teeth 31*b*. In this state, soft buffer member 35 is fitted onto external-teeth member 31 in such a manner as to be inserted into soft buffer member accommodating portion 36*c* of hard buffer member 36. As a result, respective bridge portions 35*a* are seated on an end surface of respective external teeth 31*b* which is located on the side of worm shaft 21, and respective soft buffer portions 35*b* are fitted onto a portion of the tooth flank of respective external teeth 31*b* which is located on the side of worm shaft 21 and on the radially inside of respective external teeth 31*b*.

In the assembled state, soft buffer member 35 is configured to fill the space between the tooth flank of respective external teeth 31*b* and the tooth flank of respective internal teeth 32*d* as described above. With this configuration, soft buffer member 35 is in elastic contact with the tooth flank of respective external teeth 31*b* and the tooth flank of respective internal teeth 32*d* under an unloaded condition that a torque is not inputted to motor output shaft 11 or worm shaft 21. On the other hand, hard buffer member 36 is configured such that respective hard buffer portions 36*b* have a thickness smaller than that of respective soft buffer portions 35*b*. With this configuration, predetermined circumferential clearance C2 is formed between respective bridge portions 36*a* and respective internal teeth 32*d*, and between respective hard buffer portions 36*b* and respective internal teeth 32*d* under the unloaded condition.

That is, when motor output shaft 11 and worm shaft 21 are relatively rotated due to compressive deformation of buffer member 33 and an amount of the relative rotation is small, only respective soft buffer portions 35*b* of soft buffer member 35 having a relatively small elastic modulus are compressively deformed. In contrast, when the amount of the relative rotation of motor output shaft 11 and worm shaft 21 is large, hard buffer member 36 having a relatively large elastic modulus is brought into abutment on respective internal teeth 32*d* so that hard buffer member 36 is compressively deformed together with soft buffer member 35. As a result, the torsional rigidity of joint 30 can be changed in two stages in accordance with an angle of twist thereof.

In addition, soft buffer member 35 is configured to fit onto external-teeth member 31 not in a free state thereof but under an elastically deformed condition in which the diameter is slightly increased. In a so-called sub-assembly state in which both buffer members 35, 36 are fitted onto external-teeth member 31, soft buffer member 35 is held in elastically contact with external-teeth member 31 by a restoring force which is generated due to the elastic deformation of soft buffer member 35. As a result, both buffer members 35, 36 can be prevented from falling off from external-teeth member 31.

Figure 10:
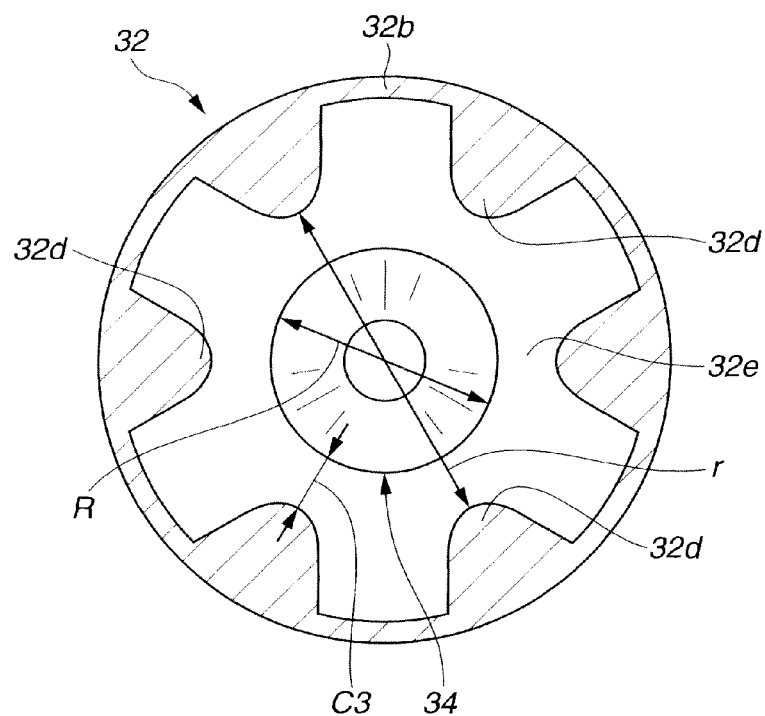
FIG. 10 is a cross section of the joint, taken along line C-C shown in FIG. 4.

As shown in FIG. 5 and FIG. 10, wave washer 34 is a generally known annular metal plate having a wavy form as a whole. Wave washer 34 has outer diameter R smaller than inner diameter r of cylindrical space 32*e* which is formed on an inner circumferential side of tip ends (i.e., radial inner ends) of internal teeth 32*d* of internal-teeth member (that is, inner diameter r of an imaginary circle defined along the tip ends of internal teeth 32*d*). In the assembled state, predetermined radial clearance C3 is generated between an outer circumferential edge of wave washer 34 and the respective tip ends of internal teeth 32*d*. That is, outer diameter R of wave washer 34 is set in a predetermined range in which the outer circumferential edge of wave washer 34 and the respective tip ends of internal teeth 32*d* are prevented from contacting with each other under such a condition that wave washer 34 is expanded into a maximum diameter, namely wave washer 34 undergoes an axial compressive deformation (or elastic deformation) to a largest extent.

Wave washer 34 has thickness d as shown in FIG. 5 which is slightly larger than axial clearance C1 formed between inside end surface 32*f* of internal-teeth member 32 (i.e., a bottom surface of annular base 32*a* defining cylindrical space 32*e*) and outside surface 35*c* of bridge portions 35*a* of soft buffer member 35. With this construction of wave washer 34, as shown in FIG. 4, wave washer 34 is elastically held in axial clearance C1. That is, thus constructed wave washer 34 can always provide an elastic force (a biasing force) which acts on motor output shaft 11 and worm shaft 21 so as to be spaced from each other in the axial direction thereof.

As shown in FIG. 4, wave washer 34 is held in elastic contact with bridge portions 35*a* of elastic soft buffer member 35 made of a rubber material and inside end surface 32*f* of non-elastic internal-teeth member 32 made of a metal material. In other words, wave washer 34 made of a metal and bridge portions 35*a* of soft buffer member 35 made of a rubber material are arranged to be in serial connection with each other in an axial direction thereof and in direct contact with each other. With this arrangement, in a case where a load larger than a predetermined amount is exerted on wave washer 34 in the axial direction, wave washer 34 is brought into an elastic deformed state while being pressed and buried into bridge portions 35a of soft buffer member 35.

When the thus constructed power steering apparatus is operated by the vehicle operator and electric motor 10 is driven by control unit 9, external-teeth member 31 on the side of motor output shaft 11 and internal-teeth member 32 on the side of worm shaft 21 are meshed with each other through buffer member 33. Owing to the meshing engagement between external-teeth member 31 and internal-teeth member 32, the rotational torque produced by electric motor 10 is transmitted from motor output shaft 11 to worm shaft 21 and then to output shaft 2 through worm wheel 22. Thus, a steering assist torque is provided to output shaft 2.

At this time, even in a case where motor output shaft 11 and worm shaft 21 are relatively rotated within such a range that hard buffer member 36 is not contacted with internal teeth 32d of internal-teeth member 32 (that is, in a case where slight vibration occurs in electric motor 10 or impact occurs due to reversal of rotational direction of electric motor 10), such vibration or impact can be prevented from being transmitted to steering wheel SW by compressive deformation of soft buffer portions 35b of soft buffer member 35. Further, since soft buffer portions 35b are in contact with the radial inside portions of the tooth flanks of respective teeth 31b, 32d, compressive deformation of soft buffer portions 35b can be more facilitated to thereby effectively absorb vibration or impact which is applied to motor output shaft 11 in the radial direction. Furthermore, soft buffer portions 35b are also in contact with the portions of the tooth flanks of respective teeth 31b, 32d which are located on the side of worm shaft 21. With this construction, worm shaft 21 can be readily inclined relative to motor output shaft 11, thereby serving for appropriate adjustment of backlash between teeth portion 21a of worm shaft 21 and teeth portion 22a of worm wheel 22 by preload mechanism 23.

On the other hand, in a case where motor output shaft 11 and worm shaft 21 are relatively rotated to a large extent beyond the above-described range, a part of respective bridge portions 36a and respective hard buffer portions 36b of hard buffer member 36 are in contact with the tooth flanks of respective teeth 31b, 32d so that soft buffer member 35 can be prevented from being further compressively deformed. Therefore, it is possible to suppress permanent set of soft buffer portions 35b due to creep thereof. In such a case, hard buffer member 36 has a relatively large pressure receiving area which is in contact with the radially outside portions of the tooth flanks of respective teeth 31b, 32d, so that the load to be applied to hard buffer portions 36b can be reduced to thereby suppress breakage of hard buffer member 36. Further, even in a case where soft buffer member 35 and/or hard buffer member 36 are broken into fragments, both soft buffer member 35 and hard buffer member 36 are accommodated in sleeve portion 32b of internal-teeth member 32, and therefore, the fragments of soft buffer member 35 and/or hard buffer member 36 can be prevented from flying off.

Functions and effects of the power steering apparatus according to the first embodiment will be explained hereinafter by referring to FIG. 2, FIG. 4, FIG. 10 and FIG. 11.

In the power steering apparatus according to the first embodiment, as shown in FIG. 2, motor output shaft 11 is supported by a pair of bearings B11, B12, and worm shaft 21 is supported by the pair of bearings B21, B22. Bearings B11, B12, B21 and B22 are constructed to have a predetermined axial backlash (axial clearance) in order to ensure appropriate bearing characteristic.

Further, the power steering apparatus according to the first embodiment is provided with joint 30 including wave washer 34. As shown in FIG. 4, wave washer 34 is disposed between a continuous flat surface formed by a tip end surface of smaller diameter portion 21c of worm shaft 21 and inside end surface 32f of base 32a of internal-teeth member 32, and outside surface 35c of respective bridge portions 35a of soft buffer member 35. That is, wave washer 34 is disposed in predetermined axial clearance C1 formed between the flat surface formed by smaller diameter portion 21c and base 32a, and bridge portions 35a, so that worm shaft 21 and motor output shaft 11 can be connected with each other through wave washer 34 and can be biased by wave washer 34 in opposite directions so as to be apart from each other by the elastic force of wave washer 34. Consequently, the axial backlash of respective bearings B11, B12, B21 and B22 can be reduced to thereby suppress axial displacement of motor output shaft 11 and worm shaft 21 which is caused due to the axial backlash of respective bearings B11, B12, B21 and B22. Further, it is possible to suppress occurrence of vibration of motor output shaft 11 and worm shaft 21 in the axial direction which is caused due to the axial displacement thereof and therefore suppress generation of so-called rattling noise due to the vibration of motor output shaft 11 and worm shaft 21.

In addition, in joint 30, wave washer 34 is arranged between the flat surface formed by smaller diameter portion 21c of worm shaft 21 and base 32a of internal-teeth member 32, and bridge portions 35a of soft buffer member 35. That is, wave washer 34 made of a metal material and soft buffer member 35 made of a rubber material are connected with each other in series in the axial direction between external-teeth member 31 and internal-teeth member 32 which are made of the metal materials. With this arrangement, when an axial load is exerted on motor output shaft 11 and worm shaft 21, wave washer 34 is elastically deformed while being pressed and buried into outside surface 35c of respective bridge portions 35a. In other words, bridge portions 35a are compressively deformed (i.e., elastically deformed) to thereby absorb a part of the axial load. Thus, at least a part of the axial load can be prevented from being effectively converted into elastic deformation of wave washer 34. Consequently, it is possible to reduce deformation of wave washer 34 which is caused due to a large axial load exerted on motor output shaft 11 and worm shaft 21, and serve for suppressing permanent set of wave washer 34 which is caused due to the plastic deformation.

Further, internal-teeth member 32 which serves as a counterpart contacted with wave washer 34 is made of a rubber material having a relatively small elastic modulus, while outer teen member 31 is made of a resin material having a relatively large elastic modulus. Therefore, as compared to a case where internal-teeth member 32 is made of such a resin material as that of outer teen member 31, wave washer 34 can be more effectively prevented from undergoing plastic deformation which is caused due to a large axial load exerted on motor output shaft 11 and worm shaft 21. As a result, wave washer 34 can be surely prevented from undergoing permanent set which is caused due to the plastic deformation.

Further, as described above, wave washer 34 and soft buffer member 35 are arranged in series. With this arrangement, as compared to a case where a unitary elastic member made of a metal material, a resin material or the like is disposed in joint 30, it is possible to suppress deterioration in elastic characteristic (i.e., permanent set) of wave washer 34 with time and thereby increase durability of the power steering apparatus.

Further, wave washer 34 is arranged not only in series relative to bridge portions 35*a* but also in direct contact (elastic contact) with bridge portions 35*a*. With this arrangement, a frictional force is generated between wave washer 34 and bridge portions 35*a* to thereby suppress a relative displacement of wave washer 34 and bridge portions 35*a*. As a result, an appropriate elastic force of wave washer 34 can be always applied to motor output shaft 11 and worm shaft 21, so that generation of rattling noise can be effectively suppressed.

In addition, as shown in FIG. 10, wave washer 34 is accommodated in cylindrical space 32*e* formed on the inner circumferential side of internal-teeth member 32. With this arrangement, a radial displacement of wave washer 34 can be restricted by respective internal teeth 32*d*, and therefore, it is possible to suppress change in elastic characteristic of wave washer 34 which is caused due to the radial displacement of wave washer 34 and enhance an efficiency of operation of assembling wave washer 34 to internal-teeth member 32. Further, in the assembled state, there is present predetermined radial clearance C3 between the outer circumferential edge of wave washer 34 and the respective tip ends of internal teeth 32*d*. With this construction, it is possible to avoid the problems such as interference between wave washer 34 and the respective tip ends of internal teeth 32*d* which causes disturbance of elastic deformation of wave washer 34 and change in elastic characteristic of wave washer 34 so that an inherent elastic characteristic of wave washer 34 cannot be obtained. As a result, occurrence of the above-described rattling noise can be effectively suppressed.

Further, since wave washer 34 is formed into the annular shape, wave washer 34 can generate the elastic force in a position spaced by a predetermined distance apart from rotation axis M of motor output shaft 11 as indicated by dashed line in FIG. 2 in a radial direction of motor output shaft 11. With this construction, even in a case where worm shaft 21 is displaced about the one axial end of motor output shaft 11 as a fulcrum to incline relative to motor output shaft 11, wave washer 34 can absorb the inclining displacement of worm shaft 21 by the elastic force to thereby prevent worm shaft 21 from being vibrated in the radial direction due to the inclining displacement of worm shaft 21. As a result, it is possible to suppress rattling noise which is generated due to the radial vibration of worm shaft 21.

Especially, in the power steering apparatus according to this embodiment, preload mechanism 23 is constructed to bias the other axial end portion 21*d* of worm shaft 21 in such a direction as to enhance the meshing between teeth 21*a* of worm shaft 21 and teeth 22*a* of worm wheel 22 (i.e., in the positive direction of axis X in FIG. 2). The operation of thus constructed preload mechanism 23 can be effectively performed without being adversely affected by the above-described inclining displacement of worm shaft 21 which can be absorbed by worm washer 34.

Further, since wave washer 34 is used as the elastic member, an axial dimension of joint 30 can be reduced as compared to a case where a coil spring is used, thereby serving for downsizing of the power steering apparatus.

Further, in contrast to a coned disk spring which is an annular elastic member, wave washer 34 is usable in a reversible manner. Therefore, as compared to a case where the coned disk spring is used, occurrence of an error in assembling operation of joint 30 can be avoided to thereby ensure better efficiency of the assembling operation of joint 30.

Figure 11:
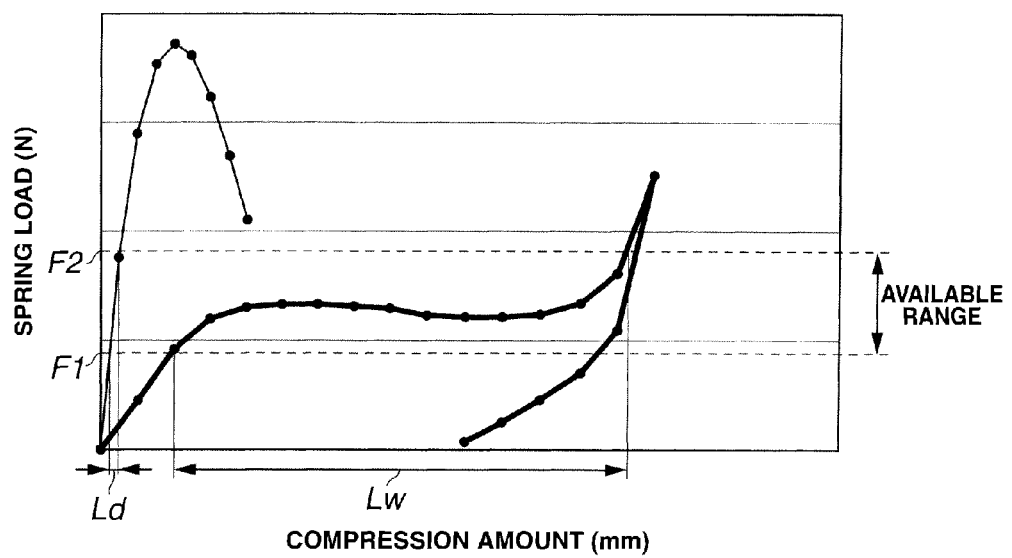
FIG. 11 is a graph showing elastic characteristics of a wave washer and a disc spring.

Furthermore, wave washer 34 is more advantageous than the coned disk spring in view of not only efficiency of the assembling operation but also elastic characteristic (load characteristic). Specifically, referring to FIG. 11, an elastic characteristic of wave washer 34 is explained in comparison to an elastic characteristic of a coned disk spring. FIG. 11 shows a relationship between compression amount and spring load in comparison between the elastic characteristic of wave washer 34 as indicated by thick line and the elastic characteristic of the coned disk spring as indicated by thin line in a case where a range of predetermined spring load (for instance, the range from F1 to F2 as shown in FIG. 11) is set as an available range. As seen from FIG. 11, range Lw of the compression amount (elastic deformation amount) of wave washer 34 is sufficiently larger than range Ld of that of the coned disk spring. In other words, wave washer 34 has a relatively small change in spring load relative to the compression amount, while the coned disk spring has a relatively large change in spring load relative to the compression amount. Owing to the difference in elastic characteristic between wave washer 34 and the coned disk spring, wave washer 34 can suppress vibration of motor output shaft 11 and worm shaft 21 by the elastic force in a more stable manner than the coned disk spring, which serves for increasing a degree of freedom of design.

Figure 12:
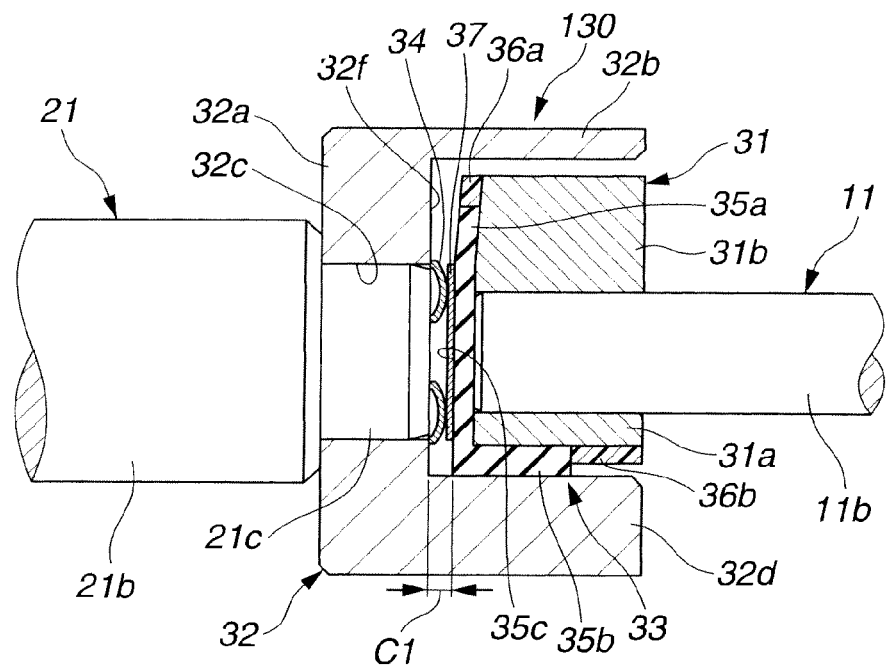
FIG. 12 is a view similar to FIG. 4, but shows an essential part of the power steering apparatus according to a second embodiment of the present invention.

Referring to FIG. 12, there is shown joint 130 according to a modification of the first embodiment which differs from joint 30 according to the first embodiment in provision of a shim (a thin plate) made of a metal. As shown in FIG. 12, joint 130 includes shim 37 disposed between wave washer 34 and bridge portions 35*a* of soft buffer member 35. Shim 37 has a flat surface which abuts on bridge portions 35*a* of soft buffer member 35.

With the arrangement of shim 37 between wave washer 34 and bridge portions 35*a* of soft buffer member 35, wave washer 34 can be prevented from being pressed into bridge portions 35*a* when wave washer 34 is elastically deformed by the axial load which is exerted on motor output shaft 11 and worm shaft 21. Therefore, it is possible to suppress change in elastic characteristic of wave washer 34 which occurs when wave washer 34 is pressed into bridge portions 35*a*. In other words, with the arrangement of shim 37, even when bridge portions 35*a* are elastically deformed, the elastic force of wave washer 34 can be hardly absorbed by bridge portions 35*a* so that an inherent elastic function of wave washer 34 can be ensured.

Further, since bridge portions 35*a* are made of a rubber material having a relatively small elastic modulus, wave washer 34 can be prevented from being pressed into bridge portions 35*a*. Therefore, it is possible to suppress deterioration in elastic characteristic (i.e., permanent set) of soft buffer member 35 with time and increase durability of the power steering apparatus.

Figure 13:
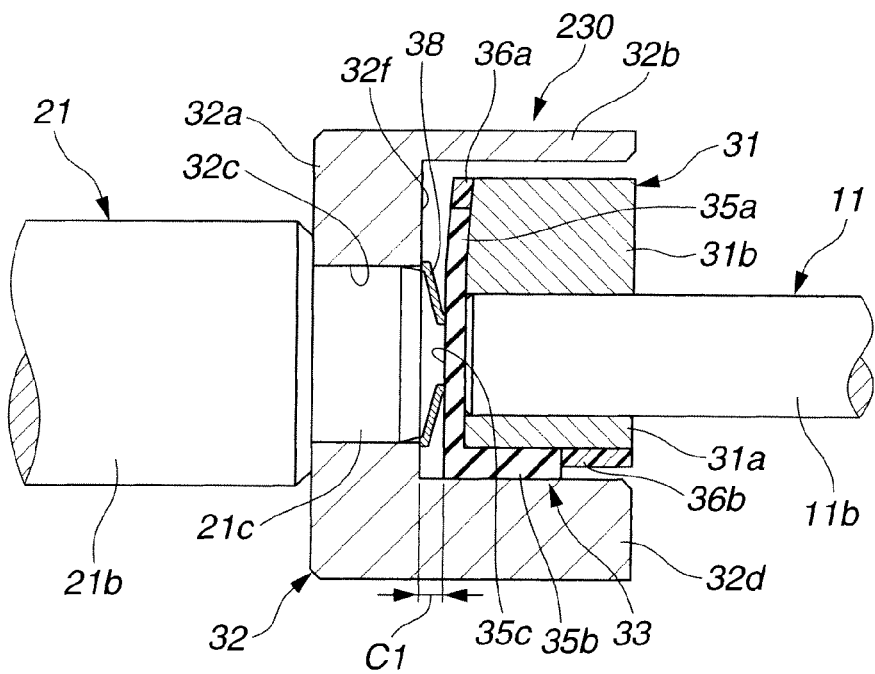
FIG. 13 is a view similar to FIG. 4, but shows an essential part of the power steering apparatus according to a third embodiment of the present invention.

Referring to FIG. 13, there is shown the power steering apparatus according to a second embodiment of the present invention which includes joint 230 using coned disk spring 38 instead of wave washer 34 of the first embodiment.

Coned disk spring 38 is an elastic member having an annular shape as well as wave washer 34. Although the second embodiment is inferior to the first embodiment in that the available range of coned disk spring 38 is relatively narrow and coned disk spring 38 is unusable in a reversible manner as explained in the first embodiment, the second embodiment can attain substantially the same function and effect as those of the first embodiment.

Figure 14:
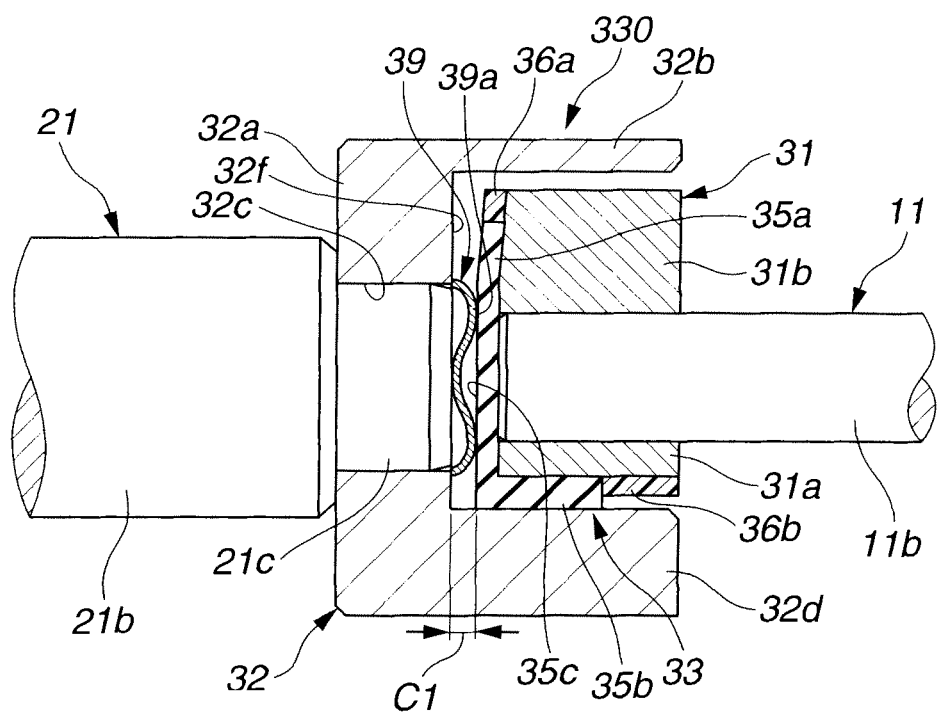
FIG. 14 is a view similar to FIG. 4, but shows an essential part of the power steering apparatus according to a fourth embodiment of the present invention.

Referring to FIG. 14, there is shown the power steering apparatus according to a third embodiment which includes joint 330 using generally disk-shaped leaf spring 39 instead of wave washer 34 of the first embodiment.

As shown in FIG. 14, leaf spring 39 has a wavy form as a whole as well as wave washer 34 of the first embodiment.

However, leaf spring 39 is constructed such that only central curved portion 39a formed in a central part of leaf spring 39 can generate an elastic force.

Although the third embodiment is inferior to the first embodiment in that leaf spring 39 performs the elastic function only in central curved portion 39a to thereby absorb the inclining displacement of worm shaft 21 which is less than the first embodiment, the third embodiment can basically attain substantially the same function and effect as those of the first embodiment.

The present invention is not limited to the above embodiments and modification thereof but further modifications thereof may be made. For instance, a dimension (such as outer diameter R and thickness d) of wave washer 34, coned disk spring and leaf spring 39 may be optionally modified in accordance with specifications of the power steering apparatus to which wave washer 34, coned disk spring and leaf spring 39 are applied.

Further, the above modification is not limited to the first embodiment and may be combined with the second embodiment and the third embodiment.

Further, although soft buffer member 35 is made of the rubber material having an elastic modulus sufficiently smaller than a resin material, the material for soft buffer member 35 is not particularly limited to the rubber material and may be a resin material having an elastic modulus sufficiently smaller than a resin material for hard buffer member 36.

Furthermore, other technical concepts and effects of the present invention which are understandable from the above embodiments are described as follows.

In a fourth aspect of the present invention, there is provided the power steering apparatus according to the first aspect, wherein the first elastic member is formed to generate the elastic force in a position spaced by a predetermined distance apart from a rotation axis of the motor output shaft in a radial direction of the motor output shaft. With this construction, in a case where the motor output shaft and the worm shaft are relatively deflected to each other, the first elastic member generates an elastic force against the deflection to thereby suppress generation of rattling noise.

In a fifth aspect of the present invention, there is provided the power steering apparatus according to the fourth aspect, wherein the first elastic member is one of an annular wave washer and a coned disk spring. With this construction, as compared to a case where a coil spring is used as the first elastic member, it is possible to suppress increase in axial dimension of the joint and thereby serve for downsizing the power steering apparatus.

In a sixth aspect of the present invention, there is provided the power steering apparatus according to the first aspect, further including a preload mechanism which biases the worm shaft in such a direction as to enhance engagement between the worm shaft and the worm wheel. With the provision of the preload mechanism, it is possible to suppress rattling noise which occurs when the worm shaft is displaced not only in the axial direction but also in the radial direction (i.e., in a deflection direction).

In a seventh aspect of the present invention, there is provided the power steering apparatus according to the sixth aspect, wherein the second bearing includes a one end side bearing supporting one axial end portion of the worm shaft which is located on a side of the joint, and the other end side bearing supporting the other axial end portion of the worm shaft which is located on an opposite side of the joint, the other end side bearing is disposed such that an amount of displacement of the other axial end portion of the worm shaft relative to a rotation axis of the worm wheel becomes larger than the one axial end portion of the worm shaft, the preload mechanism is disposed to bias the other axial end portion of the worm shaft, and the first elastic member is formed to generate the elastic force in a position spaced by a predetermined distance apart from a rotation axis of the motor output shaft in a radial direction of the motor output shaft.

Thus, the first elastic member is configured to generate an elastic force in a position spaced from the rotation axis of the motor output shaft in a radial direction of the motor output shaft. With this construction, even in a case where the worm shaft is deflected and displaced about the joint as a fulcrum to incline relative to the motor output shaft, it is possible to suppress rattling noise due to vibration of the worm shaft which is caused upon deflection and displacement of the worm shaft. In other words, it is possible to reduce problems such as generation of rattling noise and perform adjustment of a backlash of the worm gear by the preload mechanism.

In an eighth aspect of the present invention, there is provided the power steering apparatus according to the first aspect, wherein the first elastic member is arranged to be in direct contact with the second elastic member in the axial direction of the motor output shaft. With this arrangement, the first elastic member can be pressed and buried into the second elastic member, thereby suppressing a relative displacement of the first elastic member and the second elastic member which is caused when a load is exerted on the joint.

In a ninth aspect of the present invention, there is provided the power steering apparatus according to the first aspect, further including a shim disposed between the first elastic member and the second elastic member, the shim being made of a metal and having a flat surface which abuts on the second elastic member. With this construction, the first elastic member can be prevented from being pressed and buried into the second elastic member. It is possible to suppress change in elastic characteristic of the first elastic member which is caused when the first elastic member is pressed and buried into the second elastic member.

In a tenth aspect of the present invention, there is provided the power steering apparatus according to the first aspect, further including a sleeve portion disposed on an end portion of the second boss which is located on a side of the motor output shaft, wherein the first projections are disposed on an outer circumferential side of the first boss and formed to be inserted into the sleeve portion together with the first boss, the second projections are disposed on an inner circumferential side of the sleeve portion, and the first elastic member is disposed on a radial inside of a radial inner end of the respective second projections.

The second boss and the sleeve portion cooperate with each other to form a cup-shaped portion of the joint which is located on the side of the worm shaft. Further, the first elastic member is accommodated within the cup-shaped portion of the joint, specifically, in the radial inside of the radial inner end of the respective second projections extending from the sleeve portion. With this construction, a radial displacement of the first elastic member can be restricted by the radial inner end of the respective second projections to thereby suppress change in elastic characteristic of the first elastic member. Further, an operation of assembling the first elastic member to the second boss can be considerably facilitated.

In an eleventh aspect of the present invention, there is provided the power steering apparatus according to the tenth aspect, wherein the first elastic member is configured and disposed to generate a predetermined radial clearance between an outer circumferential edge of the first elastic member and the radial inner end of the respective second projections. With this construction, the first elastic member can be prevented form interfering with the second projections so that an inherent elastic characteristic of the first elastic member is ensured.

In a twelfth aspect of the present invention, there is provided the power steering apparatus according to the tenth aspect, further including a third elastic member having a plurality of portions each disposed between the first projection and the second projection which are disposed adjacent to each other in the circumferential direction so as to generate a circumferential clearance between the third elastic member and the respective second projections when the first projections are accommodated in the sleeve portion, the third elastic member being made of a resin material, wherein the second elastic member includes:
a plurality of third projections each disposed between the first projection and the second projection which are disposed adjacent to each other in the circumferential direction when the first projections are accommodated in the sleeve portion, the third projections each being disposed to fill a circumferential clearance between the first projection and the second projection which are disposed adjacent to each other in the circumferential direction, the third projections being made of a rubber material having an elastic modulus smaller than that of the resin material for the third elastic member, and
a connecting portion disposed between the first elastic member and the axial end surface of the first boss so as to connect the third projections with each other, the connecting portion being made of a same material as that for the third projections and integrally formed with the third projections.

Thus, the second elastic member which suppresses deformation of the first elastic member is made of the rubber material having an elastic modulus smaller than that of the third elastic member (i.e., the rubber material being softer than the resin material for the third elastic member). With this construction, it is possible to effectively suppress excessive deformation of the first elastic member which is caused when a large load is inputted to the first elastic member, as compared to a case where the second elastic member is made of a resin material. As a result, it is possible to suppress deterioration of the first elastic member with time (i.e., permanent set of the first elastic member) due to plastic deformation of the first elastic member.

In a thirteenth aspect of the present invention, there is provided the power steering apparatus according to the second aspect, wherein the first elastic member is formed to generate the elastic force in a position spaced by a predetermined distance apart from a rotation axis of the motor output shaft in a radial direction of the motor output shaft. With this construction, even when the worm shaft is inclined relative to the motor output shaft, that is, even when there occurs relative deflection of the worm shaft and the motor output shaft, the deflection can be absorbed by the elastic force of the first elastic member so that generation of rattling noise due to the deflection can be suppressed.

In a fourteenth aspect of the present invention, there is provided the power steering apparatus according to the thirteenth aspect, wherein the first elastic member is one of an annular wave washer and a coned disk spring. With this construction, as compared to a case where a coil spring is used as the first elastic member, it is possible to suppress increase in axial dimension of the joint and thereby serve for downsizing the power steering apparatus.

In a fifteenth aspect of the present invention, there is provided the power steering apparatus according to the second aspect, further including a preload mechanism which biases the worm shaft in such a direction as to enhance engagement between the worm shaft and the worm wheel. With this construction, it is possible to reduce a backlash of the worm gear and thereby suppress generation of striking noise in the worm gear due to the backlash. Further, it is possible to prevent radial displacement of the worm shaft and thereby suppress generation of rattling noise due to vibration of the worm shaft not only in the axial direction thereof but also in the radial direction thereof.

In a sixteenth aspect of the present invention, there is provided the power steering apparatus according to the second aspect, further including a sleeve portion disposed on an end portion of the second boss which is located on a side of the motor output shaft, wherein the first projections are disposed on an outer circumferential side of the first boss and formed to be inserted into the sleeve portion together with the first boss,
the second projections are disposed on an inner circumferential side of the sleeve portion, and
the first elastic member is disposed on a radial inside of a radial inner end of the respective second projections.

The second boss and the sleeve portion cooperate with each other to form a cup-shaped portion of the joint which is located on the side of the worm shaft. Further, the first elastic member is accommodated within the cup-shaped portion of the joint, specifically, in the radial inside of the radial inner end of the respective second projections extending from the sleeve portion. With this construction, a radial displacement of the first elastic member can be restricted by the radial inner end of the respective second projections to thereby suppress change in elastic characteristic of the first elastic member. Further, an operation of assembling the first elastic member to the second boss can be facilitated.

In a seventeenth aspect of the present invention, there is provided the power steering apparatus according to the sixteenth aspect, wherein the first elastic member is configured and disposed to generate a predetermined radial clearance between an outer circumferential edge of the first elastic member and the radial inner end of the respective second projections. With this construction, the first elastic member can be prevented form interfering with the second projections so that an inherent elastic characteristic of the first elastic member can be ensured.

In an eighteenth aspect of the present invention, there is provided the power steering apparatus according to the sixteenth aspect, further including a third elastic member having a plurality of portions each disposed between the first projection and the second projection which are disposed adjacent to each other in the circumferential direction so as to generate a circumferential clearance between the third elastic member and the respective second projections when the first projections are accommodated in the sleeve portion, the third elastic member being made of a resin material, wherein the second elastic member includes:
a plurality of third projections each disposed between the first projection and the second projection which are disposed adjacent to each other in the circumferential direction when the first projections are accommodated in the sleeve portion, the third projections each being disposed to fill a circumferential clearance between the first projection and the second projection disposed adjacent to each other in the circumferential direction, the third projections being made of a rubber material having an elastic modulus smaller than that of the resin material for the third elastic member, and a connecting portion disposed between the first elastic member and the axial end surface of the first boss so as to connect the third projections with each other, the connecting portion being made of a same material as that for the third projections and integrally formed with the third projections.

Thus, the second elastic member which suppresses deformation of the first elastic member is made of the rubber material having an elastic modulus smaller than that of the third elastic member (i.e., the rubber material being softer than the resin material for the third elastic member). With this construction, it is possible to effectively suppress excessive deformation of the first elastic member which is caused when a large load is inputted to the first elastic member, as compared to a case where the second elastic member is made of the resin material. As a result, it is possible to suppress deterioration of the first elastic member with time (i.e., permanent set of the first elastic member) due to plastic deformation of the first elastic member.

In a nineteenth aspect of the present invention, there is provided the power steering apparatus according to the second aspect, further including a shim disposed between the first elastic member and the second elastic member, the shim being made of a metal and having a flat surface which abuts on the second elastic member. With this construction, the first elastic member can be prevented from being pressed and buried into the second elastic member. It is possible to suppress change in elastic characteristic of the first elastic member which is caused when the first elastic member is pressed and buried into the second elastic member.

In a twentieth aspect of the present invention, there is provided the power steering apparatus according to the third aspect, further including a preload mechanism which biases the worm shaft in such a direction as to enhance engagement between the worm shaft and the worm wheel. With this construction, it is possible to reduce a backlash of the worm gear and thereby suppress generation of striking noise in the worm gear due to the backlash. Further, it is possible to prevent radial displacement of the worm shaft and thereby suppress generation of rattling noise due to vibration of the worm shaft not only in the axial direction thereof but also in the radial direction thereof.

This application is based on a prior Japanese Patent Application No. 2010-79969 filed on Mar. 31, 2010. The entire contents of the Japanese Patent Application No. 2010-79969 are hereby incorporated by reference.

Although the invention has been described above by reference to certain embodiments and modifications of the invention, the invention is not limited to the embodiment described above. Further modifications and variations of the embodiments and modifications described above will occur to those skilled in the art in light of the above teachings. The scope of the invention is defined with reference to the following claims.

What is claimed is:

1. A power steering apparatus comprising:
a steering mechanism constructed to transmit a rotational operation of a steering wheel to steerable road wheels;
an electric motor having a motor output shaft rotatably supported by a first bearing, the electric motor providing the steering mechanism with a steering force via the motor output shaft;
a worm gear including a worm wheel disposed on the steering mechanism, and a worm shaft rotatably supported by a second bearing and being engageable with the worm wheel; and
a joint which connects the motor output shaft with the worm shaft so as to transmit a rotational torque of the motor output shaft to the worm shaft;
the joint comprising:
a first boss disposed on an axial end portion of the motor output shaft which is located on a side of the worm shaft;
a plurality of first projections disposed on the first boss in a circumferential direction of the first boss, the respective first projections extending in a radial direction of the first boss,
a second boss disposed on an axial end portion of the worm shaft which is located on a side of the motor output shaft, in an opposed relation to the first boss in an axial direction of the motor output shaft;
a plurality of second projections disposed on the second boss in a circumferential direction of the second boss and arranged between the first projections disposed adjacent to each other in the circumferential direction of the first boss, the second projections each extending in a radial direction of the second boss and transmitting a rotational torque of the electric motor transmitted through the first projections to the worm shaft;
a first elastic member disposed between an axial end surface of the first boss and an opposed axial end surface of the second boss which is opposed to the axial end surface of the first boss, the first elastic member being made of a metal material and formed to be elastically deformable in the axial direction the motor output shaft, and
a second elastic member disposed between the axial end surface of the first boss and the opposed axial end surface of the second boss, the second elastic member being made of at least one of a resin material and a rubber material, the second elastic member cooperating with the first elastic member to generate an elastic force in such a direction as to move the worm shaft away from the motor output shaft, the second elastic member being compressively deformable so as to reduce an amount of deformation of the first elastic member when the first elastic member is compressively deformed due to a relative displacement of the motor output shaft and the worm shaft.

2. The power steering apparatus as claimed in claim 1, wherein the first elastic member is formed to generate the elastic force in a position spaced by a predetermined distance apart from a rotation axis of the motor output shaft in a radial direction of the motor output shaft.

3. The power steering apparatus as claimed in claim 2, wherein the first elastic member is one of an annular wave washer and a coned disk spring.

4. The power steering apparatus as claimed in claim 1, further comprising a preload mechanism which biases the worm shaft in such a direction as to enhance engagement between the worm shaft and the worm wheel.

5. The power steering apparatus as claimed in claim 4, wherein the second bearing comprises a one end side bearing supporting one axial end portion of the worm shaft which is located on a side of the joint, and the other end side bearing supporting the other axial end portion of the worm shaft which is located on an opposite side of the joint, the other end side bearing is disposed such that an amount of displacement of the other axial end portion of the worm shaft relative to a rotation axis of the worm wheel becomes larger than the one axial end portion of the worm shaft, the preload mechanism is disposed to bias the other axial end portion of the worm shaft, and the first elastic member is formed to generate the elastic force in a position spaced by a predetermined distance apart from a rotation axis of the motor output shaft in a radial direction of the motor output shaft.

6. The power steering apparatus as claimed in claim 1, wherein the first elastic member is arranged to be in direct contact with the second elastic member in the axial direction of the motor output shaft.

7. The power steering apparatus as claimed in claim 1, further comprising a shim disposed between the first elastic member and the second elastic member, the shim being made of a metal and having a flat surface which abuts on the second elastic member.

8. The power steering apparatus as claimed in claim 1, further comprising a sleeve portion disposed on an end portion of the second boss which is located on a side of the motor output shaft, wherein the first projections are disposed on an outer circumferential side of the first boss and formed to be inserted into the sleeve portion together with the first boss, the second projections are disposed on an inner circumferential side of the sleeve portion, and the first elastic member is disposed on a radial inside of a radial inner end of the respective second projections.

9. The power steering apparatus as claimed in claim 8, wherein the first elastic member is configured and disposed to generate a predetermined radial clearance between an outer circumferential edge of the first elastic member and the radial inner end of the respective second projections.

10. The power steering apparatus as claimed in claim 8, further comprising a third elastic member having a plurality of portions each disposed between the first projection and the second projection which are disposed adjacent to each other in the circumferential direction so as to generate a circumferential clearance between the third elastic member and the respective second projections when the first projections are accommodated in the sleeve portion, the third elastic member being made of a resin material, wherein the second elastic member comprises:

a plurality of third projections each disposed between the first projection and the second projection which are disposed adjacent to each other in the circumferential direction when the first projections are accommodated in the sleeve portion, the third projections each being disposed to fill a circumferential clearance between the first projection and the second projection which are disposed adjacent to each other in the circumferential direction, the third projections being made of a rubber material having an elastic modulus smaller than that of the resin material for the third elastic member, and a connecting portion disposed between the first elastic member and the axial end surface of the first boss so as to connect the third projections with each other, the connecting portion being made of a same material as that for the third projections and integrally formed with the third projections.

11. A power steering apparatus comprising:

a steering mechanism constructed to transmit a rotational operation of a steering wheel to steerable road wheels;

an electric motor having a motor output shaft rotatably supported by a first bearing, the electric motor providing the steering mechanism with a steering force via the motor output shaft;

a worm gear including a worm wheel disposed on the steering mechanism, and a worm shaft rotatably supported by a second bearing and being engageable with the worm wheel; and a joint which connects the motor output shaft with the worm shaft so as to transmit a rotational torque of the motor output shaft to the worm shaft;

the joint comprising:

a first boss disposed on an axial end portion of the motor output shaft which is located on a side of the worm shaft;

a plurality of first projections disposed on the first boss in a circumferential direction of the first boss, the respective first projections extending in a radial direction of the first boss, a second boss disposed on an axial end portion of the worm shaft which is located on a side of the motor output shaft, in an opposed relation to the first boss in an axial direction of the motor output shaft;

a plurality of second projections disposed on the second boss in a circumferential direction of the second boss and arranged between the first projections disposed adjacent to each other in the circumferential direction of the first boss, the second projections each extending in a radial direction of the second boss and transmitting a rotational torque of the electric motor transmitted through the first projections to the worm shaft;

a first elastic member disposed between an axial end surface of the first boss and an opposed axial end surface of the second boss which is opposed to the axial end surface of the first boss, the first elastic member being made of a metal material and formed to be elastically deformable in the axial direction the motor output shaft, and a second elastic member disposed between the axial end surface of the first boss and the first elastic member or between the opposed axial end surface of the second boss and the first elastic member, the second elastic member being made of at least one of a resin material and a rubber material, the second elastic member cooperating with the first elastic member to generate an elastic force in such a direction as to move the worm shaft away from the motor output shaft.

12. The power steering apparatus as claimed in claim 11, wherein the first elastic member is formed to generate the elastic force in a position spaced by a predetermined distance apart from a rotation axis of the motor output shaft in a radial direction of the motor output shaft.

13. The power steering apparatus as claimed in claim 12, wherein the first elastic member is one of an annular wave washer and a coned disk spring.

14. The power steering apparatus as claimed in claim 11, further comprising a preload mechanism which biases the worm shaft in such a direction as to enhance engagement between the worm shaft and the worm wheel.

15. The power steering apparatus as claimed in claim 11, further comprising a sleeve portion disposed on an end portion of the second boss which is located on a side of the motor output shaft, wherein the first projections are disposed on an outer circumferential side of the first boss and formed to be inserted into the sleeve portion together with the first boss, the second projections are disposed on an inner circumferential side of the sleeve portion, and the first elastic member is disposed on a radial inside of a radial inner end of the respective second projections.

16. The power steering apparatus as claimed in claim 15, wherein the first elastic member is configured and disposed to generate a predetermined radial clearance between an outer circumferential edge of the first elastic member and the radial inner end of the respective second projections.

17. The power steering apparatus as claimed in claim 15, further comprising a third elastic member having a plurality of portions each disposed between the first projection and the second projection which are disposed adjacent to each other in the circumferential direction so as to generate a circumferential clearance between the third elastic member and the respective second projections when the first projections are accommodated in the sleeve portion, the third elastic member being made of a resin material, wherein the second elastic member comprises:
a plurality of third projections each disposed between the first projection and the second projection which are disposed adjacent to each other in the circumferential direction when the first projections are accommodated in the sleeve portion, the third projections each being disposed to fill a circumferential clearance between the first projection and the second projection disposed adjacent to each other in the circumferential direction, the third projections being made of a rubber material having an elastic modulus smaller than that of the resin material for the third elastic member, and
a connecting portion disposed between the first elastic member and the axial end surface of the first boss so as to connect the third projections with each other, the connecting portion being made of a same material as that for the third projections and integrally formed with the third projections.

18. The power steering apparatus as claimed in claim 11, further comprising a shim disposed between the first elastic member and the second elastic member, the shim being made of a metal and having a flat surface which abuts on the second elastic member.

19. A power steering apparatus comprising:
a steering mechanism constructed to transmit a rotational operation of a steering wheel to steerable road wheels;
an electric motor having a motor output shaft rotatably supported by a first bearing, the electric motor providing the steering mechanism with a steering force via the motor output shaft;
a worm gear including a worm wheel disposed on the steering mechanism, and a worm shaft rotatably supported by a second bearing and being engageable with the worm wheel; and
a joint which connects the motor output shaft with the worm shaft so as to transmit a rotational torque of the motor output shaft to the worm shaft;
the joint comprising:
a first boss disposed on an axial end portion of the motor output shaft which is located on a side of the worm shaft;
a plurality of first projections disposed on an outer circumferential side of the first boss, the respective first projections extending in a radial direction of the first boss,
a second boss disposed on an axial end portion of the worm shaft which is located on a side of the motor output shaft, in an opposed relation to the first boss in an axial direction of the motor output shaft;
a sleeve portion disposed on an end portion of the second boss which is located on a side of the motor output shaft, the sleeve portion being formed to surround the first boss and the first projections,
a plurality of second projections disposed on an inner circumferential side of the sleeve portion in a circumferential direction of the sleeve portion, the second projections being arranged between the first projections disposed adjacent to each other in the circumferential direction of the first boss, the respective second projections extending in a radial direction of the sleeve portion and transmitting a rotational torque of the electric motor transmitted through the first projections to the worm shaft;
a first elastic member of an annular shape disposed between an axial end surface of the first boss and an opposed axial end surface of the second boss which is opposed to the axial end surface of the first boss, the first elastic member being disposed on a radial inside of a radial inner end of the respective second projections, the first elastic member being made of a metal material and formed to be elastically deformable in the axial direction the motor output shaft, and
a second elastic member comprising:
a plurality of third projections disposed on the second elastic member in circumferential direction of the second elastic member, the third projections each being disposed between the first projection and the second projection which are disposed adjacent to each other in the circumferential direction when the first projections are accommodated in the sleeve portion, the third projections each being disposed to fill a circumferential clearance between the first projection and the second projection which are disposed adjacent to each other in the circumferential direction, the third projections being made of at least one of a resin material and a rubber material, and
a connecting portion disposed between the first elastic member and the axial end surface of the first boss so as to connect the third projections with each other, the connecting portion being made of a same material as that for the third projections and integrally formed with the third projections, the connecting portion cooperating with the first elastic member to generate an elastic force in such a direction as to move the worm shaft away from the motor output shaft.

20. The power steering apparatus as claimed in claim 19, further comprising a preload mechanism which biases the worm shaft in such a direction as to enhance engagement between the worm shaft and the worm wheel.

* * * * *